United States Patent
Jung et al.

(10) Patent No.: US 10,316,806 B2
(45) Date of Patent: Jun. 11, 2019

(54) APPARATUS FOR REDUCING FUEL EVAPORATION GAS USING CLOSEABLE PATH STRUCTURE

(71) Applicants: Hyundai Motor Company, Seoul (KR); Kia Motors Corporation, Seoul (KR)

(72) Inventors: Jung-Wu Jung, Suwon-si (KR); Chul-Kyu Kwack, Gunpo-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/826,416

(22) Filed: Nov. 29, 2017

(65) Prior Publication Data
US 2018/0171947 A1 Jun. 21, 2018

(30) Foreign Application Priority Data
Dec. 15, 2016 (KR) .......... 10-2016-0171575

(51) Int. Cl.
*F02M 35/10* (2006.01)
*F02M 33/04* (2006.01)
*F02M 25/08* (2006.01)
*B01D 46/00* (2006.01)

(52) U.S. Cl.
CPC ... *F02M 35/10281* (2013.01); *B01D 46/0036* (2013.01); *F02M 25/08* (2013.01); *F02M 33/04* (2013.01); *F02M 35/10255* (2013.01)

(58) Field of Classification Search
CPC ....... F02M 35/10281; F02M 35/10255; F02M 33/04; F02M 25/08; B01D 46/0036

USPC ........................................... 123/518
See application file for complete search history.

(56) References Cited

U.S. PATENT DOCUMENTS

| | | | | |
|---|---|---|---|---|
| 3,572,013 A * | 3/1971 | Hansen | .............. | F02M 35/08 123/519 |
| 5,970,963 A * | 10/1999 | Nakase | .............. | F02M 35/1211 123/184.21 |
| 7,213,581 B2 * | 5/2007 | Burke | .............. | B01D 53/0446 123/516 |
| 2002/0174851 A1 * | 11/2002 | Elliot | .............. | F02D 9/1015 123/337 |

(Continued)

FOREIGN PATENT DOCUMENTS

| | | |
|---|---|---|
| JP | S 5399413 U | 1/1952 |
| JP | S 53214 U | 1/1978 |

(Continued)

*Primary Examiner* — Mahmoud Gimie
(74) *Attorney, Agent, or Firm* — Morgan, Lewis & Bockius LLP

(57) ABSTRACT

An apparatus for reducing fuel evaporation gas using a closeable path structure, which is configured such that a path through which fuel evaporation gas can flow is narrowed when an engine stops, may include an intake pipe through which air is drawn into the engine, and an openable door disposed to open or close the intake pipe and configured such that, when the engine is operated, the openable door opens the intake pipe, and when the engine is stopped, the openable door closes the intake pipe, wherein a fuel evaporation gas trap configured to collect the fuel evaporation gas may be disposed on an internal wall of a portion of the intake pipe on which the openable door is disposed.

8 Claims, 4 Drawing Sheets

(56) References Cited

U.S. PATENT DOCUMENTS

2005/0145224 A1* 7/2005 Zulauf .................. B01D 53/02
                                                                    123/518
2010/0089368 A1* 4/2010 Hirata ................ B01D 53/0431
                                                                    123/518

FOREIGN PATENT DOCUMENTS

| JP | 2003120336 A | * | 4/2003 | ............. F02B 31/00 |
| JP | 2006-037865 A |  | 2/2006 | |
| JP | 2010-116848 A |  | 5/2010 | |
| KR | 10-1998-0022214 A |  | 7/1998 | |
| KR | 20-1999-0003001 U |  | 1/1999 | |

* cited by examiner

APPARATUS FOR REDUCING FUEL EVAPORATION GAS USING CLOSEABLE PATH STRUCTURE

CROSS-REFERENCE(S) TO RELATED APPLICATIONS

The present application claims priority to Korean Patent Application No. 10-2016-0171575, filed on Dec. 15, 2016, the entire contents of which is incorporated herein for all purposes by this reference.

BACKGROUND OF THE INVENTION

Field of the Invention

The present invention relates to an apparatus for reducing fuel evaporation gas generated by an evaporation of fuel, and more particularly, the present invention relates to an apparatus for reducing fuel evaporation gas using a closeable path structure, which is configured such that a path through which fuel evaporation gas can flow is narrowed when an engine stops, and in which a fuel evaporation gas trap is disposed around the narrowed portion of the path so that fuel evaporation gas can be prevented from being diffused into the atmosphere.

Description of Related Art

Vehicles may discharge various types of hazardous substances during operation. Emissions of hazardous substances must be controlled under regulations. The regulation standards are being gradually tightened.

Fuel evaporation gas which is generated by evaporation of fuel may also generate such hazardous substances. The fuel evaporation gas includes hydrocarbon as a main component. While the vehicle is in operation, the fuel evaporation gas is removed by supplying the fuel evaporation gas into an engine and combusting the gas.

However, after the engine stops, the fuel evaporation gas is discharged from the engine to the atmosphere by diffusion in an intake pipe through which air is drawn into the engine.

In an effort to overcome the above-mentioned problem, as shown in FIG. 1, there was provided a technique in which a fuel evaporation gas trap 103 configured for collecting fuel evaporation gas is disposed in an intake pipe 101 so that fuel evaporation gas can be collected by the fuel evaporation trap 103.

However, according to the conventional technique, when fuel evaporation gas flows through the intake pipe 101, some of the fuel evaporation gas flows through a path which is not adjacent to the fuel evaporation gas trap 103 because a flow path defined in the intake pipe 101 is relatively wide. For example, when fuel evaporation gas flows through a center portion of the intake pipe 101, the fuel evaporation gas may flow without being collected by the fuel evaporation gas trap 103. Consequently, as shown in FIG. 1, fuel evaporation gas which remains in the intake pipe 101 may be discharged from the engine to the atmosphere through the intake pipe 101 and the air cleaner 102, thus causing air pollution.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an apparatus configured for reducing fuel evaporation gas using a closeable path structure, which is configured such that, when an engine is in operation, a supply of air to the engine is not impeded, and when the engine is in a stopped state, a flow of fuel evaporation gas from the engine can be minimized, fuel evaporation gas can be guided so that the gas flows along an internal surface of the intake pipe 11, and the fuel evaporation gas can collected by a fuel evaporation gas trap.

Other various aspects of the present invention can be understood by the following description, and become apparent with reference to the exemplary embodiments of the present invention. Also, it is obvious to those skilled in the art to which the present invention pertains that the objects and advantages of the present invention can be realized by the means as claimed and combinations thereof.

In accordance with various exemplary embodiments of the present invention, there is provided an apparatus configured for reducing fuel evaporation gas using a closeable path structure, the apparatus may include an intake pipe through which air is drawn into an engine; and an openable door disposed to open or close the intake pipe and configured such that, when the engine is operated, the openable door opens the intake pipe, and when the engine is stopped, the openable door closes the intake pipe.

The openable door may be disposed wherein a periphery of the openable door is brought into contact with an internal surface of the intake pipe or is disposed adjacent thereto when the openable door closes the intake pipe.

The openable door may be hinged at an upper end portion thereof to an upper portion of an internal wall of the intake pipe.

When the engine is operated, the openable door may be opened by air flowing into the engine.

A collision prevention chamber may be formed in the intake pipe and receive the openable door when the openable door opens, so that the openable door is prevented from coming into contact with the internal surface of the intake pipe.

A shock absorption member may be mounted on an internal surface of the collision prevention chamber so that the shock absorption member absorbs a shock generated when the openable door comes into contact therewith.

The openable door may be disposed at a position at which the intake pipe is coupled with an air cleaner.

A fuel evaporation gas trap configured to collect the fuel evaporation gas may be disposed on an internal wall of a portion of the intake pipe on which the openable door is disposed.

The fuel evaporation gas trap may be disposed on an internal circumferential portion of the intake pipe other than a portion of the intake pipe on which the openable door is hinged.

When the engine stops, the openable door may be located on a portion of the fuel evaporation gas trap which is adjacent to an atmosphere.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
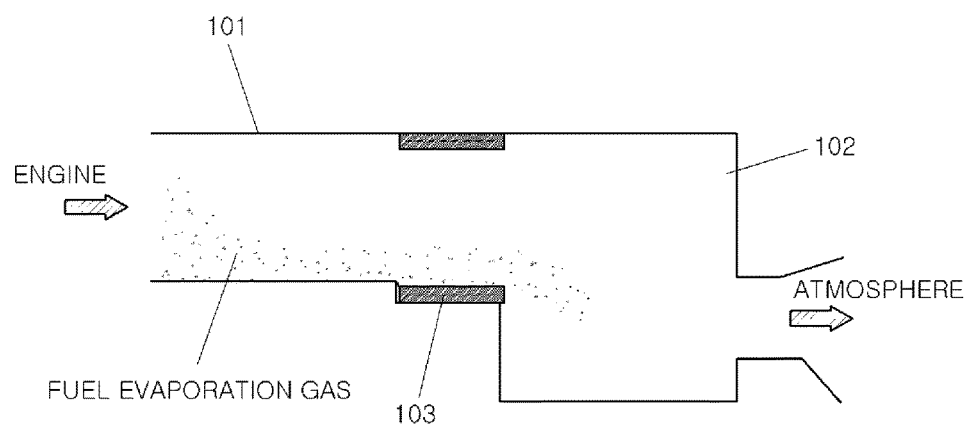
FIG. 1 is a sectional view illustrating a state in which fuel evaporation gas is expelled by diffusion from an internal of an intake pipe according to a conventional technique.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and the shapes will be determined in part by the particularly intended application and use environment.

In the figures, reference numbers refer to the same or equivalent parts of the present invention throughout the several figures.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

An apparatus for reducing fuel evaporation gas using a closeable path structure according to an exemplary embodiment of the present invention includes an intake pipe 11 through which external air is drawn into an engine, and an openable door 14 which is disposed to open or close the intake pipe 11 and is operated wherein the intake pipe 11 opens when the engine is in operation, and the intake pipe 11 is closed when the engine stops. A fuel evaporation gas trap 13 for collecting the fuel evaporation gas is disposed on an internal surface of a portion of the intake pipe 11 in which the openable door 14 is disposed.

For combustion of the engine, air may be drawn into the engine. The air is drawn into the engine through the intake pipe 11 coupled to a predetermined portion of the engine.

One end portion of the intake pipe 11 which is opposite to the engine is coupled to an air cleaner 12 which filters out foreign substances from the air.

The openable door 14 is disposed on the internal surface of the intake pipe 11 to open or close the intake pipe 11. The openable door 14 is hinged to the internal surface of the intake pipe 11 to be rotatable about a hinge shaft 14a.

The openable door 13 is hinged at an upper end portion thereof to an upper portion of the internal surface of the intake pipe 11 by the hinge shaft 14a. Since the upper end portion of the openable door 14 is hinged to the internal surface of the intake pipe 11, the openable door 14 is closed by gravity, and when air flows into the intake pipe 11, the openable door 14 is opened by the flow of air. Provided the fact that the openable door 14 is closed by gravity in the intake pipe 11, when the engine stops and there is no air flow in the intake pipe 11, the openable door 14 closes the intake pipe 11 so that fuel evaporation gas can be prevented from being diffused from the intake pipe 11 into the atmosphere.

When the openable door 14 is closed, the periphery of the openable door 14 is brought into contact with an internal wall of the intake pipe 11 or is disposed adjacent thereto. The operable door 14 is disposed adjacent to the internal wall of the intake pipe 11 with a slight gap therebetween rather than making contact therewith.

The openable door 14 may include a lightweight material including plastic or synthetic resin so that the openable door 14 can be closed by gravity and opened when air flows through the intake pipe 11.

Here, the openable door 14 may be disposed in the junction between the intake pipe 11 and the air cleaner 12 which filters out foreign substances from air drawn from the atmosphere.

A collision prevention chamber 11a is formed in the intake pipe 11 to prevent noise from occurring due to a collision of the openable door 14 with the internal wall of the intake pipe 11 when the openable door 14 opens to a maximum degree. More specifically, the collision prevention chamber 11a extends outwardly from the intake pipe 11, so that the collision prevention chamber 11a forms a region configured for receiving the openable door 14 when the openable door 14 opens to the maximum degree. Consequently, the openable door 14 can be prevented from colliding with the internal wall of the intake pipe 11. A shock absorption member 15 formed of a material including rubber or sponge be mounted in the collision prevention chamber 11a.

The fuel evaporation gas trap 13 is provided in the portion of the intake pipe 11 in which the openable door 14 is disposed.

The fuel evaporation gas trap 13 collects fuel evaporation gas, and discharges the collected fuel evaporation gas when external air is drawn into the engine, thus combusting the fuel evaporation gas in the engine.

The fuel evaporation gas trap 13 is formed to enclose the openable door 14 in the intake pipe 11. The fuel evaporation gas trap 13 be formed to enclose a portion of the openable door 14 other than an upper end portion thereof. Since the upper end portion of the openable door 14 is coupled to the intake pipe 11 by the hinge shaft 14a, there is no flow of fuel evaporation gas around the upper end portion of the openable door 14. Because fuel evaporation gas is heavier than air, the fuel evaporation gas flows while enclosing opposite sides and a lower end portion of the openable door 14.

Since the fuel evaporation gas trap 13 is disposed in the intake pipe 11, the durability of the intake pipe 11 can be enhanced compared to the case where only the openable door 14, which is a movable member, is disposed.

The operation of the apparatus for reducing fuel evaporation gas using the closeable path structure according to an exemplary embodiment of the present invention having the above-mentioned configuration will be described below.

Figure 2:
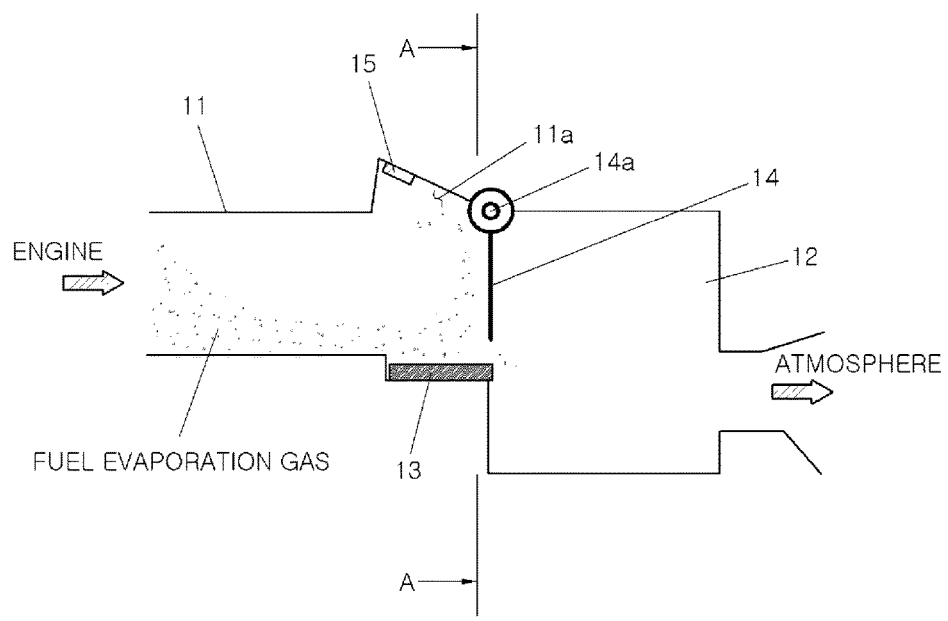
FIG. 2 is a sectional view illustrating an operation of an apparatus for reducing fuel evaporation gas using a closeable path structure when an engine is in a stopped state according to an exemplary embodiment of the present invention.
Figure 3:
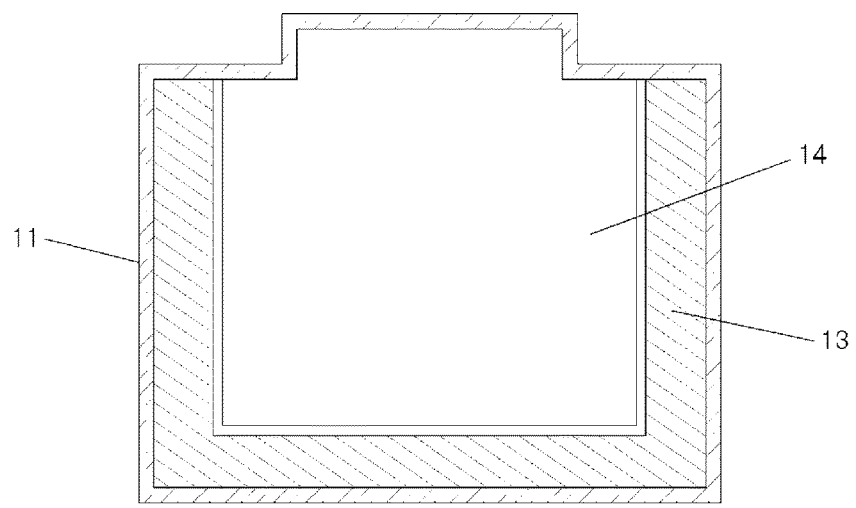
FIG. 3 is a sectional view taken along line A-A of FIG. 2.
Figure 4:
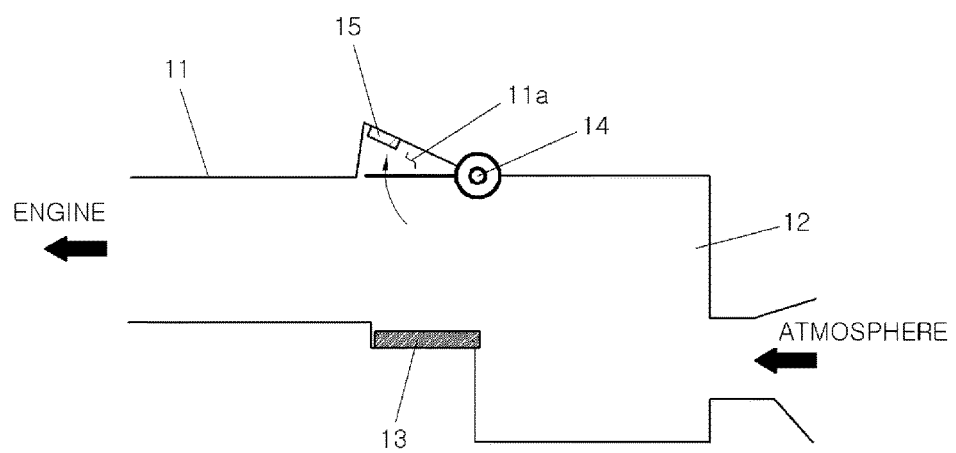
FIG. 4 is a sectional view illustrating an operation of an apparatus for reducing fuel evaporation gas when the engine is in operation according to an exemplary embodiment of the present invention.

As shown in FIG. 2, in the fuel evaporation gas reduction apparatus according to an exemplary embodiment of the present invention, when the engine is not in operation, the openable door 14 closes the intake pipe 11 to primarily prevent fuel evaporation gas which remains in the intake pipe 11 from being discharged to the atmosphere. In the present case, the openable door 14 is oriented downward by gravity. As shown in FIG. 3, the periphery of the openable door 14 is brought into contact with the internal surface of the intake pipe 11 or is disposed adjacent thereto, so that the fuel evaporation gas can be primarily prevented from being discharged to the atmosphere.

Here, although the fuel evaporation gas is primarily blocked from being diffused into the atmosphere by the openable door 14 in the intake pipe 11, a small amount of fuel evaporation gas may be diffused into the atmosphere through a gap between the openable door 14 and the intake pipe 11 or a gap between the openable door 14 and the fuel evaporation gas trap 13.

However, fuel evaporation gas which flows through the gap between the openable door 14 and the intake 11 or the fuel evaporation gas trap 13 may pass by the fuel evaporation gas trap 13. Therefore, the fuel evaporation gas is collected by the fuel evaporation gas trap 13.

Because fuel evaporation gas is heavier than air, even though the fuel evaporation gas trap 13 is disposed around the openable door 14 on only some portions (opposite sides and lower end portions) of the internal wall of the intake pipe 11 other than the upper portion of the intake pipe 11, the fuel evaporation gas can be collected in the fuel evaporation gas trap 13. Therefore, the fuel evaporation gas can be secondarily prevented from being diffused into the atmosphere.

Accordingly, thanks to the openable door 14 and the fuel evaporation trap 13, diffusion of fuel evaporation gas is blocked, and the fuel evaporation gas is collected. Therefore, diffusion of fuel evaporation gas into the atmosphere can be minimized, thus meeting regulations related to fuel evaporation gas.

Meanwhile, when the engine is in operation, external air is drawn through the air cleaner 12 and supplied into the engine through the intake pipe 11. In the present case, the openable door 14 is rotated and opened by air flowing into the engine so that the openable door 14 does not impede the air flow into the engine.

The flow rate and velocity of air flowing into the engine vary depending on driving conditions of the engine. When the degree with which the openable door 14 opens varies, noise may occur by contact between the openable door 14 and the upper portion of the internal surface of the intake pipe 11. However, in an exemplary embodiment of the present invention, the collision prevention chamber 11a is formed in the intake pipe 11, and the shock absorption member 15 is mounted in the collision prevention chamber 11a. Therefore, the present invention can prevent a phenomenon in which noise is generated by collision of the openable door 14 with the internal wall of the intake pipe 11.

As described above, in an apparatus for reducing fuel evaporation gas using a closeable path structure according to an exemplary embodiment of the present invention having the above-mentioned configuration, when an engine stops, an openable door is rotated by gravity so that an intake pipe can be almost completely closed by the openable door. Fuel evaporation gas can be primarily prevented from being discharged from the internal of the intake pipe to the atmosphere by diffusion.

While the openable door is closed, fuel evaporation gas flows along an internal surface of the intake pipe and is collected by the fuel evaporation gas trap disposed on the internal surface of the intake pipe, wherein the fuel evaporation gas can be secondarily prevented from being discharged to the atmosphere. Therefore, most of the fuel evaporation gas can be prevented from being discharged to the atmosphere when the engine is in the stopped state.

Furthermore, when the engine is in operation, the openable door is rotated toward the internal surface of the intake pipe by air which is drawn into the engine. Hence, loss of intake air is not caused.

Furthermore, because there is no need to bring the openable door into close contact with the internal surface of the intake pipe, a separate component for bringing the openable door into close contact with the internal surface of the intake pipe is not required. Therefore, an increase in the production cost can be minimized.

For convenience in explanation and accurate definition in the appended claims, the terms "upper", "lower", "up", "down", "upwards", "downwards", "internal", "outer", "inside", "outside", "inwardly", "outwardly", "internal", "external", "front", "rear", "back", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An apparatus for reducing fuel evaporation gas using a closeable path structure, the apparatus comprising:
    an intake pipe through which air is drawn into an engine; and
    an openable door disposed to open or close the intake pipe and configured such that, when the engine is operated, the openable door is configured to open the intake pipe, and when the engine is stopped, the openable door is configured to close the intake pipe,
    wherein a collision prevention chamber is formed in the intake pipe and receives the openable door when the openable door opens, such that the openable door is prevented from contacting with the internal surface of the intake pipe,
    wherein a shock absorption member is mounted on an internal surface of the collision prevention chamber so that the shock absorption member absorbs shock when the openable door contacts therewith, and
    wherein a fuel evaporation gas trap configured to collect the fuel evaporation gas is disposed on an internal wall of a portion of the intake pipe on which the openable door is disposed.

2. The apparatus of claim 1, wherein a periphery of the openable door is brought into contact with an internal surface of the intake pipe or is disposed adjacent thereto when the openable door closes the intake pipe.

3. The apparatus of claim 1, wherein the openable door is hinged at an upper end portion thereof to an upper portion of an internal wall of the intake pipe.

4. The apparatus of claim 1, wherein, when the engine is operated, the openable door is opened by air flowing into the engine.

5. The apparatus of claim 1, wherein the openable door is disposed at a position at which the intake pipe is coupled with an air cleaner.

6. The apparatus of claim 1, wherein the fuel evaporation gas trap is disposed on an internal circumferential portion of the intake pipe except a portion of the intake pipe on which the openable door is hinged.

7. The apparatus of claim 1, wherein, when the engine stops, the openable door is located on a portion of the fuel evaporation gas trap which is adjacent to an atmosphere.

8. The apparatus of claim 1, wherein the openable door is pivotally connected to the intake pipe by a hinge shaft and the fuel evaporation gas trap is disposed downstream of the hinge shaft on the internal wall in the intake pipe.

* * * * *